March 5, 1940.  W. H. LIVINGSTON  2,192,712
ILLUMINATED SIGN
Filed Nov. 13, 1939  2 Sheets-Sheet 1
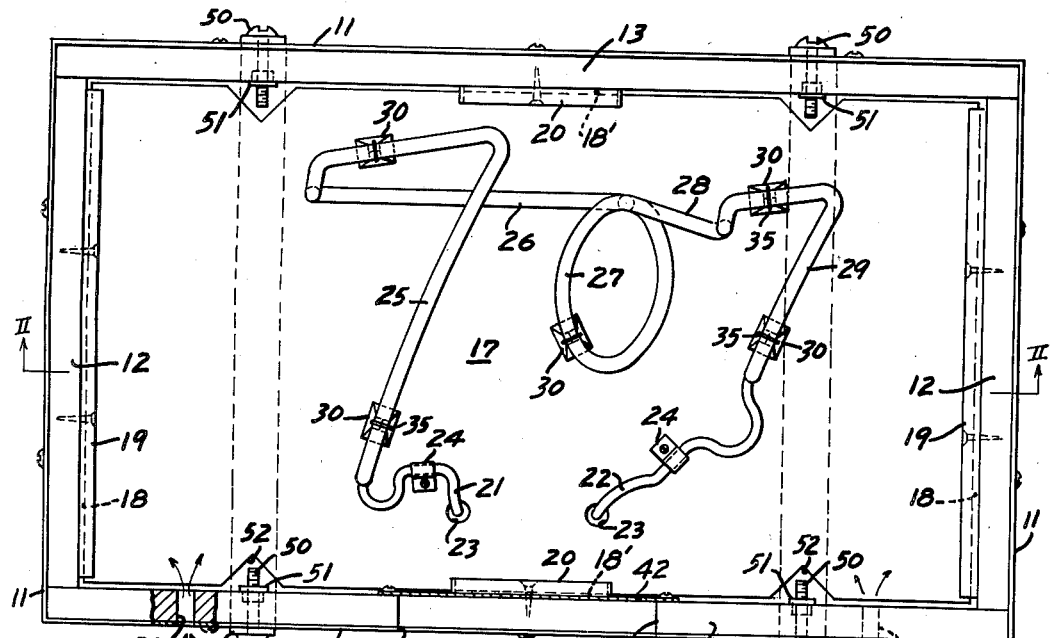
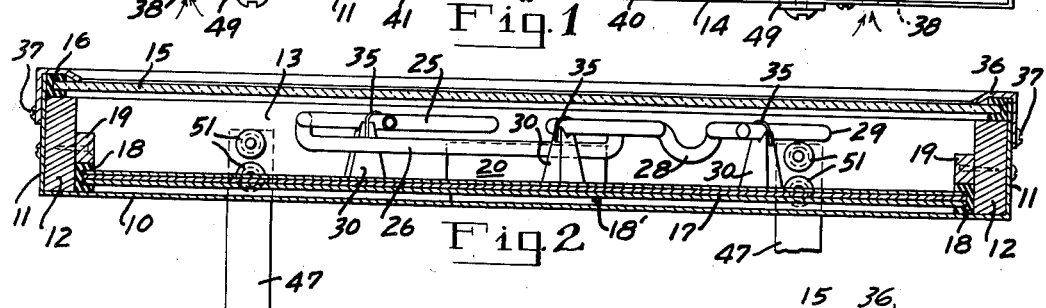
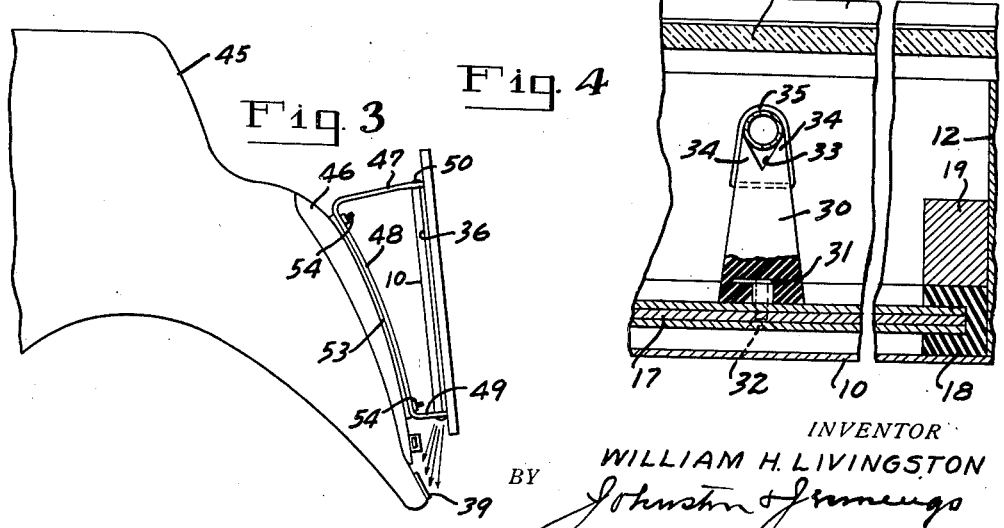
INVENTOR
WILLIAM H. LIVINGSTON
BY
ATTORNEYS March 5, 1940. W. H. LIVINGSTON 2,192,712
ILLUMINATED SIGN
Filed Nov. 13, 1939 2 Sheets-Sheet 2

INVENTOR
WILLIAM H. LIVINGSTON
BY
ATTORNEYS

Patented Mar. 5, 1940

2,192,712

UNITED STATES PATENT OFFICE 2,192,712

ILLUMINATED SIGN

William H. Livingston, Birmingham, Ala., assignor to Preston Y. Whitman, Birmingham, Ala.

Application November 13, 1939, Serial No. 304,049

10 Claims. (Cl. 40—132)

My invention relates to illuminated signs, and is more particularly concerned with signs having "neon" or like tubing as the lighting medium and which are adapted to be mounted on taxicabs, trucks and other vehicles, for advertising purposes.

Illuminated advertising signs for vehicles, to be commercially successful, must embody means for the protection of the delicate "neon" tubing from fracture due to the jolting and jarring normally encountered by road vehicles and also to the shocks that will result from the sign being mounted on the downwardly swinging door which closes the rear trunk or storage compartment.

The main object of my invention, therefore, is to devise a simple, inexpensive and yet very effective cushioning means for mounting the "neon" tubing so as to insure its long life under such severe conditions of use and at the same time to provide a secure and strong resilient mounting which will permit the "neon" tubing as a whole to float free of rigid connection at any point to the sign frame.

A further object of my invention is to simplify and perfect the manner of mounting the "neon" tubing panel in resilient cushions so designed and arranged as to allow it to give in all directions and to permit of the simple and ready removal and replacement of the "neon" mounting panel, when occasion arises.

A further feature of my invention is to improve the manner of mounting the glass cover over the sign so that it is resiliently supported and can be readily removed, interchanged and replaced without disturbing the mounting frame or the "neon" tube panel therein.

My invention further comprises the use of tapered resilient cushion supports for the "neon" tubing which are preferably reduced to a very small cross section at their upper ends so as to provide laterally flexible support for the tubing, which are preferably provided with V-grooves to accommodate tubing of different diameters, and which carry at their tops fastening wires for the tubing.

My invention further comprises the novel arrangement of ventilating ports which are so related to the glass cover that they will provide ample ventilation behind it and prevent the cover becoming coated with moisture due to condensation.

My invention further comprises designing and arranging one of the sign frames with openings to reflect light from within the sign onto the license plate of the vehicle bearing it, suitable provision being made to reflect this light as a white light on the plate and if desirable to dispose a luminous section of the "neon" tubing immediately above said aperture.

My invention further comprises a novel sign mounting so designed and arranged as to be flexible to conform to the curvature of the body portion of the car or vehicle to which it may be attached and provided with a cushion coextensive with its body engaging surface and adapted to take up any slack that may be left in the bent portion of bracket so as to prevent it vibrating under service conditions and to avoid the necessity of accurately positioning the mounting bolts for the brackets.

My invention further comprises the novel details of construction and arrangement of parts which, in their preferred embodiments only, are illustrated in the accompanying drawings which form a part of this specification, and in which—

Fig. 1 is a front elevation of the sign frame with its glass cover removed and a portion of the frame base broken away to show one of the bottom vents therein.

Fig. 2 is a cross sectional view, taken on the line II—II of Fig. 1, showing the glass cover in position.

Fig. 3 is an end view of the sign mounted in vertical display position on the rear door of an automobile.

Fig. 4 is an enlarged detail view in cross section through a portion of the frame and "neon" tube panel, showing one of the resilient tube supports in elevation, partly broken away, and also showing the marginal resilient channel mounting for the "neon" tube panel.

Similar reference numerals refer to similar parts throughout the drawings.

Figure 5:
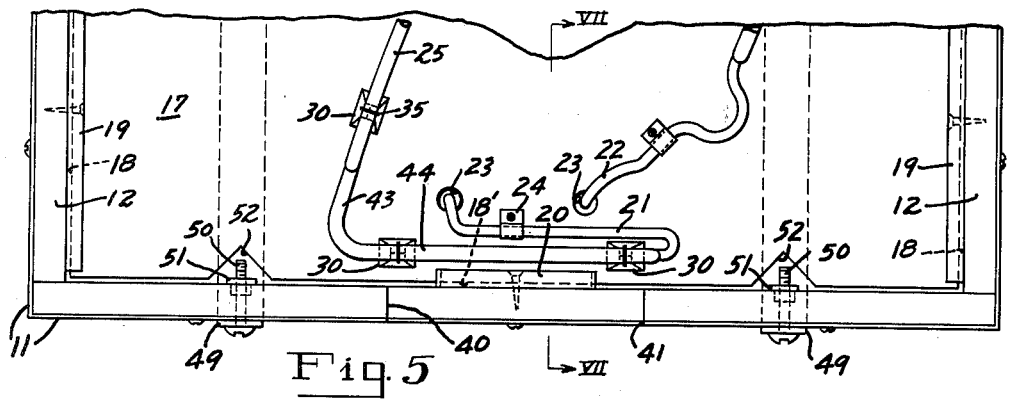
Figure 5 is a fragmental view of the lower half of the frame as shown in Fig. 1 with a modified arrangement of the "neon" tubing so as to directly illuminate the license plate below through the bottom opening in the frame.

In the preferred embodiment of my invention, the sign comprises a metallic frame formed of sheet metal shaped to provide a back wall 10 and marginal walls 11 within which the sign elements are enclosed. This being a light metallic frame I reinforce it along its side edges with boards 12 and along its top and bottom edges respectively with boards 13 and 14, which boards are screwed or otherwise connected to the frame walls 11 and terminate sufficiently below the upper level of the latter to accommodate the glass cover 15 and its resilient mounting channel 16.

The illuminating elements of the sign are mounted upon a ply-board or like light and yet rigid panel 17 and the manner of resiliently mounting this panel so that it will have limited floating play in the frame is an important feature of my invention.

As a preferred manner of mounting I fit snugly over each end edge of this panel a rubber channel strip 18 which rests against the back wall 10 and against the end boards 12, being held against forward displacement by the retaining strips 19 screwed or nailed to the end boards 12. The upper and lower edges of the panel are held in spaced relation to the boards 13 and 14 by mounting thereon short resilient channel strips indicated in dotted lines at 18', Fig. 1, above, and in engagement with each of these short upper and lower channels strips 18' is a retaining strip 20. The elements 20 and 18' are disposed in the center and are so short that they leave the major portion of the upper and lower edges of the panel free of any holding or restraining influence except such as is derived from the rubber channel strips 18 and 18' and engagement of the strips 18 with the end boards 12. This manner of mounting permits the panel to have a floating support which will absorb shocks from all directions in all planes and which will permit the panel to have some cocking play at its corners about the center retaining element 18' and 20.

The glass cover 15 has applied color decoration and display on its under face so arranged that it will leave exposed the requisite letters or numerals to produce the advertising display.

As shown in Fig. 1, the sign is arranged to display the numerals 707, but these are typical of any lettering or design that may be desired. The color is so applied to cover 15 that there is left a translucent portion to make this numeral display, and under and adjacent to and coextensive with these translucent portions of the glass I arrange the "neon" or other tubing. The conductors 21 and 22 for supplying the current to the "neon" lighting design enter through apertures in the back wall 10 which register with enlarged openings 23 in the panel 17. The conductors are led from the openings 23 and are engaged by clips to fixedly anchor them to the panel. Beyond these clips a loop is formed in the conductors and they are respectively connected to the ends of the tube design, which as shown comprises the large numeral 7 defined by the luminous tubing 25 which is connected to the conductor 21 at one end and at the other end is connected by a non-luminous section 26 to a luminous tubing 27 forming a naught, and connected by a non-luminous section 28 to a luminous section 29 forming a small numeral 7, which at its end is connected to the conductor 22, thus completing the circuit. These luminous tubing sections are charged with a suitable gas and under the action of the electric current become highly luminous where not covered by an opaque substance and the luminous portions of the tubing are arranged in central register with the transparent portions of the glass panel 15. All the tubing shown being continuous and fragile, it is important that it be mounted so that it may freely yield to absorb shocks and jars which it will receive, despite the cushion mounting of the panel, and to this end I provide a series of rubber or like cushion blocks 30 which as will be noted in Fig. 4 serve to support the tubing in the sign casing close to the glass cover 15. These blocks are widened at their base to receive a center threaded thimble 31 adapted to receive a screw 32 which is passed up through the panel with its head countersunk flush therein and acts to clamp the cushion block securely at its center to the panel. The block tapers sharply from its base to its tip and there I cut a transverse groove 33, preferably V-shaped with two objects in view, one being to form a tapering seat that will accommodate tubing of different diameters and the other being to support the tubing on the block between two relatively thin highly flexible side supporting elements 34. A wire or like tying medium 35 is passed through a hole provided in the top of the block just below the groove 33 and it is passed over the tube and tied or twisted to hold the tube securely in place in a supporting cradle at the top of the block which is of such shape that this top is free to give and sway laterally without restraint imposed thereon either by the tie means 35 or by the block mounting elements 31, 32.

After the tubing has been suitably mounted on the panel and the panel secured in place within the sign frame, the glass cover 15, surrounded by its resilient mounting channel 16, is seated on top of the boards 12, 13 and 14 and clamped in position thereon by the marginal frame 36 formed of angle metal stock, the side edges of which snugly telescope over the side walls 11 of the metal frame and are connected thereto and to the said boards by screws 37. The frame 36 has its inner marginal lip bent down beyond the channel 16 to engage the glass 15. To prevent condensation of moisture on the inside of the glass cover 15, I bore vents 38 through the bottom board 14 and provide holes registering therewith in the bottom frame wall 11.

Figure 7:
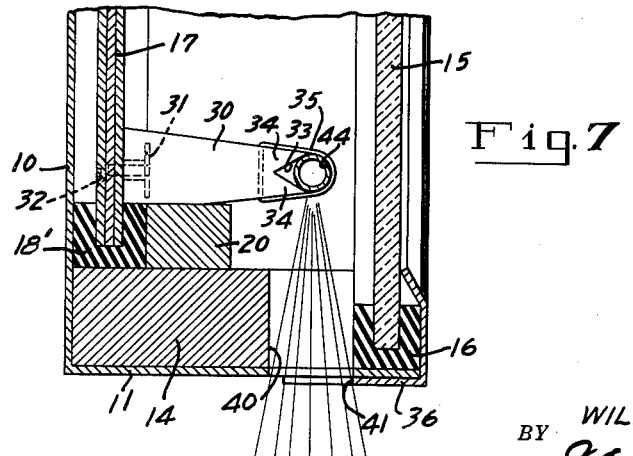
Fig. 7 is an enlarged cross section view taken on the line VII—VII of Fig. 5 showing the relationship of the direct luminating tubing to the opening opposite the license plate.

In certain States requirement is made that the car license plate 39 (Fig. 3) be illuminated by a white light and where the "neon" tubing produces a colored light it is proposed to provide a slot or cut-away portion 40 in the bottom board 14, or in any other board in position where the light is desired to illuminate the license plate, and registering openings 41 are formed opposite it in the frames 11 and 36, see Fig. 7. Where the slot 40 is left open the vents 38 may be dispensed with.

Figure 6:
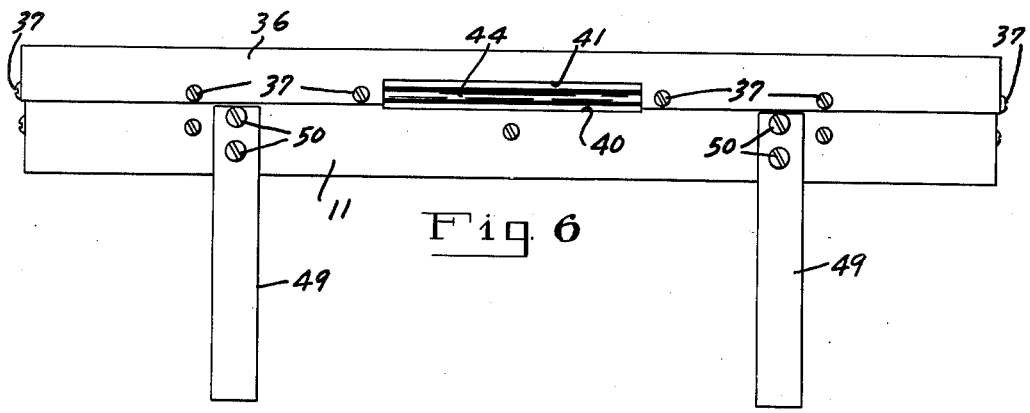
Fig. 6 is a bottom view of Fig. 5.

In Fig. 5 I show a modification of the tubing in that an opaque extension 43 connects the tubing 25 with a translucent section 44 lying centrally over and in juxtaposition to the opening 40 (Fig. 6), this section 44 being connected to the conductor 21 which is led back to the left hand opening 23.

Referring more particularly to Figs. 1 and 3, it will be seen that the main frame 10 is adapted to be mounted on the automobile or vehicle 45, preferably on its rear door 46 if it be a taxicab and special consideration must be given to the manner of mounting this sign on the car. I show the sign provided with two U-shaped brackets each comprising a long upper leg 47, a downwardly curved back leg and a short bottom leg 49. The legs 47 and 49 are, as shown in Fig. 1, connected to the top and bottom edges of the main frame by means of bolts 50 which are passed through registering openings in the upper and lower frame wall 11 and through the upper and lower boards 13 and 14 and are screwed through thimbles 51 seated flush in the inner walls of said boards. These screw bolts may terminate flush with the thimbles 21 but if they project beyond as shown it is advisable to cut in the panel 17 notches 52 so that these bolts will offer no restraint to the play of the panel on its flexible mounting. Between each bracket leg 48 and the car door 46, I interpose an elastic or rubber strip 53 which corresponds substantially in width and length with member 48 and which has important functions, namely, to provide a resilient mounting for the brackets and to avoid the necessity of boring the holes accurately for the bracket mounting bolts 54 so that if the frame member 48 does not conform exactly to the curvature of the rear element on which it is mounted this interposed pad 53 will cushion it so it will not slap or have vibratory play and will yield to permit the bolts to be engaged in slightly off center bolt holes.

Thus it will be seen that I have provided a sign in which the maximum protection is provided for the delicate "neon" tubing element which represents the high factor of maintenance cost to keep these signs in service condition. When a jolt or jar comes upon these signs from any direction it is absorbed by either or all of the following elements, the bracket cushions 53, the panel cushions 18 and 18', the cushion blocks 30, and the tapered top lips 34 of these blocks, which can sway relatively to their anchor bolts 32 without restraint from the tube anchor wires 35 while allowing their elements 34 to yield freely to absorb lateral thrusts coming on them from the tubing. This gives it a true floating mounting and yet one that possesses ample strength for holding the panel in working position. It should be borne in mind when these illuminated signs are mounted on the back doors of taxicabs, these back doors are being constantly raised for access to the baggage compartment and hurriedly dropped, and further that they are at the rear end of the car where they get the whip from the bouncing of the car body. In actual practice, observing one of these signs with a taxicab in motion or with the door being dropped, the "neon" tube system can be seen to have free vibratory play, there being no rigid restraint upon it at any point but its mounting is such that it will be yieldably held always in correct operating position with respect to the glass 15.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an illuminated sign for vehicles, a box frame, rear mounting brackets therefor, a panel loosely fitted into the box, top and side elastic channel supports for said panel seated against the box back and marginal walls, hold-down cleats for said channels detachably secured in the box, elastic flexible posts fastened to the panel, a tube lighting fixture secured to the tops of said posts, and a glass cover decorated to define a display opposite luminous parts of said tube and yieldably mounted as a cover for the box.

2. A sign according to claim 1, in which the side channel supports for the panel extend substantially for the length of the panel ends, but the top and bottom channel supports are restricted to the center portions of the panel top and bottom edge to allow limited cocking play for the panel.

3. In an illuminated sign, a panel, a box enclosing same, a glass display cover yieldably mounted as a closure for the box, yieldable supports on the panel in the form of upright rubber posts having bottom means to anchor them in the panel so that they are free to yield laterally in all directions, a tubular illuminating means, and means to secure said latter means to the free ends of said posts.

4. A sign according to claim 3, in which the free ends of the posts have top V-grooves to receive the illuminating tube.

5. A sign according to claim 3, in which the means for securing the tubular illuminating means to the posts are tie wires made fast in the free ends of said posts.

6. A sign according to claim 3, in which the posts have V-grooves in their free ends to receive the illuminating tube, and the securing means for the latter is a wire passing through the post and immediately below its V-groove and made fast about the tube.

7. A sign comprising a shallow box with a demountable glass cover, a panel resiliently mounted so as to have free limited play in the box, an illuminating tube flexibly mounted on said panel, and vertically disposed V-shaped brackets for mounting the box in upright position on the back of a vehicle, and a cushion strip mounted lengthwise between the vertical leg of each bracket and the vehicle back.

8. A sign comprising a shallow box with a demountable glass cover, a panel resiliently mounted so as to have free limited play in the box, an illuminating tube flexibly mounted on said panel, and vertically disposed V-shaped brackets for mounting the box in upright position on the back of a vehicle, a cushion substantially coextensive with the vertical leg of each bracket, and mounting bolts inserted through said bracket legs and the cushion ends to yieldably mount the sign on the vehicle.

9. A sign according to claim 7, in which the vertical leg of each bracket is elongated and sufficiently flexible to be readily conformed to the vehicle back and its mounting bolts pass also through its respective cushion strip.

10. A sign according to claim 3, in which air vents are provided in a protected position under the sign box for the admission of air to prevent moisture collecting on the inner side of the glass display cover.

WILLIAM H. LIVINGSTON.